No. 689,533. Patented Dec. 24, 1901.
S. BARINGER.
CUTTING APPARATUS FOR HARVESTING MACHINES.
(Application filed Mar. 5, 1901.)
(No Model.) 2 Sheets—Sheet 1.
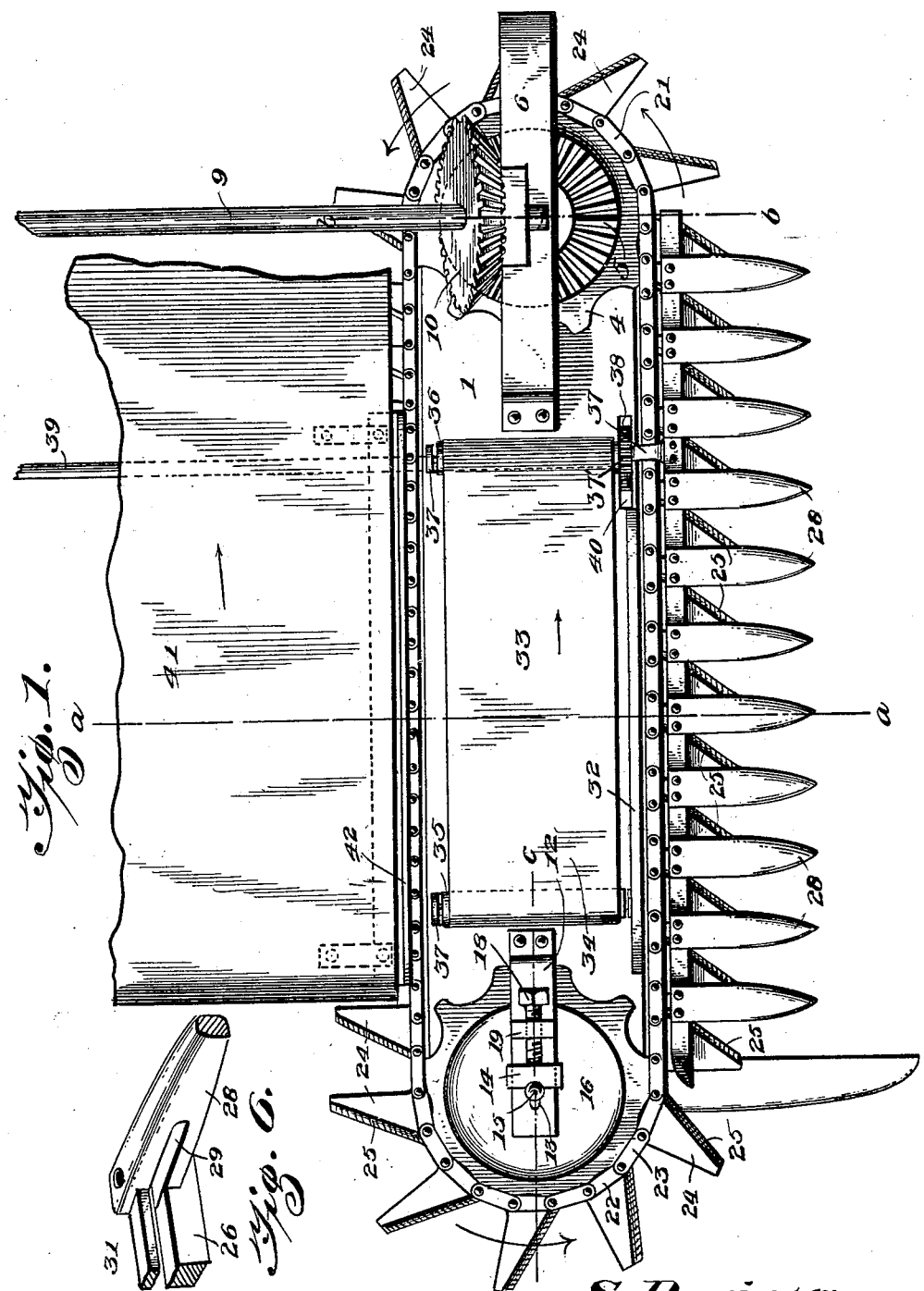

No. 689,533. Patented Dec. 24, 1901.
S. BARINGER.
CUTTING APPARATUS FOR HARVESTING MACHINES.
(Application filed Mar. 5, 1901.)
(No Model.) 2 Sheets—Sheet 2.
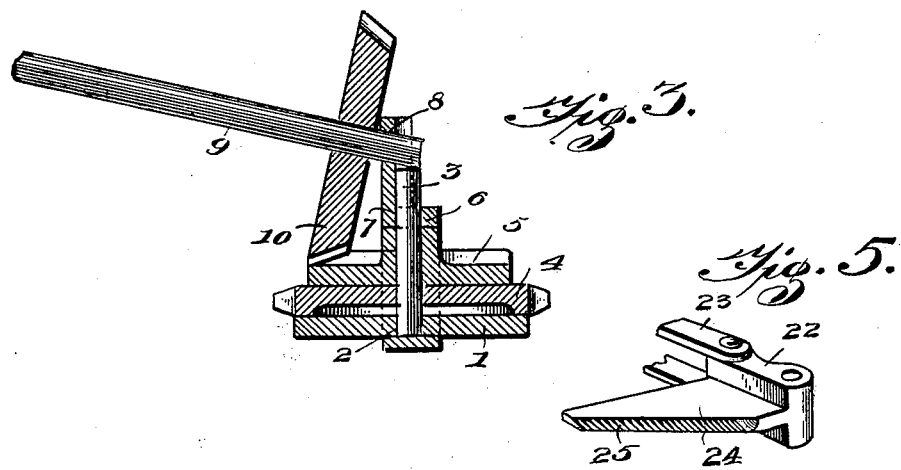
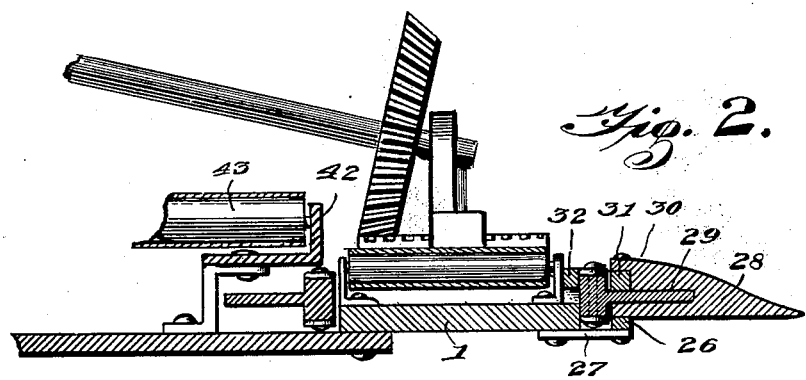
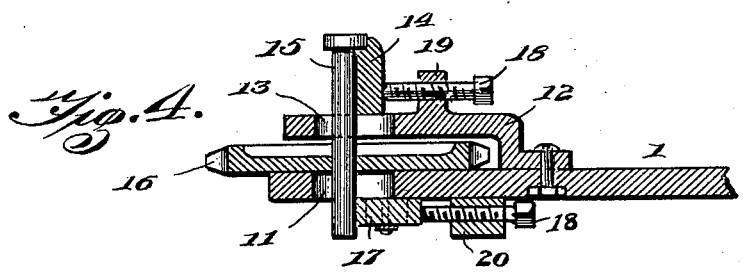
Witnesses S. Baringer Inventor
by C. A. Snow & Co.
Attorneys

United States Patent Office.

SYLVESTER BARINGER, OF BEATTIE, KANSAS.

CUTTING APPARATUS FOR HARVESTING-MACHINES.

SPECIFICATION forming part of Letters Patent No. 689,533, dated December 24, 1901.

Application filed March 5, 1901. Serial No. 49,852. (No model.)

*To all whom it may concern:*

Be it known that I, SYLVESTER BARINGER, a citizen of the United States, residing at Beattie, in the county of Marshall and State of Kansas, have invented a new and useful Cutting Apparatus for Harvesting-Machines, of which the following is a specification.

My invention is an improved cutting apparatus for harvesting-machines, the object of my invention being to provide an improved endless traveling chain which carries the cutter-plates, and thereby relieve the cutting apparatus of the jar and rattling stress incident to the operation of the reciprocating cutter-bars usually employed in machines of this class.

My invention consists in the peculiar construction and combination of devices hereinafter fully set forth and claimed.

In the accompanying drawings, Figure 1 is a top plan view of a cutting apparatus constructed in accordance with my invention and the coacting parts of a harvesting-machine. Fig. 2 is a vertical transverse sectional view taken on the line $a\ a$ of Fig. 1. Fig. 3 is a detail sectional view taken on the line $b\ b$ of Fig. 1. Fig. 4 is a similar view taken on the line $c\ c$ of Fig. 1. Fig. 5 is a detail perspective view of one of the endless traveling cutter-plates. Fig. 6 is a detail perspective view.

The base-plate 1, which supports the cutting apparatus, is provided at its inner end with a bearing 2 for the lower end of a short vertical shaft 3, on which is fixed a sprocket-wheel 4 and a gear-wheel 5. Said sprocket-wheel is disposed on the upper side of the plate 1, and said gear-wheel is above said sprocket-wheel. A bracket 6, which is secured on the inner end of the said plate 1, has a bearing 7 for the upper portion of the said shaft 3 and is further provided with a bearing 8 for a counter-shaft 9, which projects forward from the harvesting-machine (not shown) and is provided with a gear-wheel 10, which meshes with the gear 5, and thereby rotates the same, together with the said sprocket-wheel 4. In the outer end of the base-plate 1 is an elongated slot 11. A bracket 12 is bolted on said plate 1, near the outer end thereof, has a slot 13 disposed over the slot 11, and is provided with an adjustable bearing 14 for the upper portion of a short vertical shaft 15, on which rotates a sprocket-wheel 16. The said shaft passes through the slots 11 13, and the lower portion thereof is engaged by an adjustable bearing 17. Said bearings 14 17 are adjusted by means of screws 18, which operate in threaded openings in bosses 19 20, with which the bracket 12 and the plate 1 are respectively provided.

An endless traveling chain 21 connects the sprocket-wheels 4 16. The said chain is composed of metallic blocks 22 and links 23, which connect the said blocks. The latter are of the form shown, and each of the same is formed integrally with a cutter-plate 24, the said cutter-plates projecting from the outer sides of the said blocks. Each cutter-plate has on one side an obliquely-disposed serrated cutting edge 25. The length of the blocks 22 and links 23 is such that the sprockets or spurs of the sprocket-wheels engage the spaces between the said blocks. Said links 23 are on the upper and lower sides of the said blocks 22, and the spurs of the sprocket-wheels pass between the said links, as will be understood. The shaft 15, which carries the sprocket-wheel 16 at the outer end of the base-plate, being adjustable by the means hereinbefore described, the endless traveling cutter-chain may be maintained at all times at the requisite tension, as will be understood.

A finger-bar 26 is disposed in front of the plate 1 and supported and connected to said plate by suitable metallic straps 27, which are bolted to the under side of said finger-bar and to the under side of said plate. The fingers 28, which are carried by the said finger-bar, are of suitable construction and are provided in their rear sides with open slots 29, through which the cutter-plates pass, the said fingers coacting with the said cutter-plates in cutting the grain, as will be understood. Above the finger-bar and connected to the rearward-extending upper arms 30 of the fingers is a bar 31. A runway is formed between the said finger-bar 26 and said bar 31 for the cutter-plates on the front operative lead of the chain, the said front lead of the chain operating in the runway formed between the front side of the base-plate 1 and the rear sides of the finger-bar 26 and bar 31. A bar 32 is supported above the front portion of the base-plate 1 and bears against the rear side of the front lead of the cutter-chain, the said bar 32, together with the front side of the said base-plate 1, keeping the said front lead of the cutter-chain straight, and hence maintaining the cutter-plates in operative relation to the fingers under all conditions.

An auxiliary platform conveyer 33, which comprises an endless traveling apron 34 and rollers 35 36, is disposed above the base-plate 1 and extends from end to end thereof between the sprocket-wheels. The said rollers are journaled in bearings 37, and the roller 36 has a spur-pinion 37' at its front end, which is engaged by a spur-wheel 38 on the front end of an operating-shaft 39. The latter projects forward from the frame of the harvesting-machine (not shown) and under the plate 1, and the spur-wheel 38 operates through a slot 40, which is made in the said plate 1. The function of said shaft 39 and said gears 37' 38 is to cause the upper lead of the auxiliary platform conveyer to travel in the direction indicated by the arrow in Fig. 1. The platform conveyer 41, which is of the usual construction, is disposed in rear of the auxiliary platform conveyer, and an angle-bar 42, which has bearings for the journals at the front ends of certain of the rollers 43 of said platform conveyer, is disposed between the front side of the platform conveyer and the rear lead of the endless traveling cutter-chain. Said angle-bar 42 is interposed between the cutter-plates on the rear lead of the said cutter-chain and the said platform conveyer 41 and form a shield for the latter. The said platform conveyer 41 and auxiliary conveyer 33 convey the grain as the same is cut to the usual elevating-conveyer, (not here shown, as the same is well understood and forms no part of my invention,) which elevating-conveyer delivers the grain to the binding mechanism, which may be of any suitable construction.

It will be understood that in practice the parts of the cutting apparatus at the ends of the auxiliary conveyer and the gears 5 10 will be suitably incased and that the relative proportions of the parts will not be such as is shown in Fig. 1 of the drawings, which is intended merely to show the construction and arrangement of the parts embodying my invention.

Having thus described my invention, I claim—

1. In a cutting apparatus of the class described, the combination of a finger-bar having fingers, an endless traveling cutter-chain having cutter-plates which coact with said fingers, an auxiliary platform conveyer disposed between the leads of said chain and a platform conveyer in rear of said auxiliary conveyer, substantially as described.

2. In a harvester, the combination of an endless traveling cutting mechanism having front and rear leads, an auxiliary platform conveyer disposed between the leads of the cutting mechanism, and a platform conveyer in rear of said auxiliary conveyer, substantially as described.

3. In a cutting apparatus of the class described, the combination of a base-plate, sprocket-wheels, an endless traveling cutter-chain connecting and operated by said sprocket-wheels, the front and rear leads of said cutter-chain operating on the front and rear sides of said base-plate, a bar 32 on the front side of said base-plate bearing against the rear side of the front lead of said chain, cutter-plates carried by said chain, a finger-bar supported in front of said base-plate, fingers on said finger-bar having open slots in which the said cutter-plates operate, and a bar 31 secured to the said fingers, said bar coacting with said finger-bar to form a raceway for the said cutter-plates, substantially as described.

In testimony that I claim the foregoing as my own I have hereto affixed my signature in the presence of two witnesses.

SYLVESTER BARINGER.

Witnesses:
HERBERT J. GARNETT,
JOSEPH BAER.